(No Model.)
H. F. THOMSEN.
Electrical Indicator and Recorder.
No. 232,156. Patented Sept. 14, 1880.
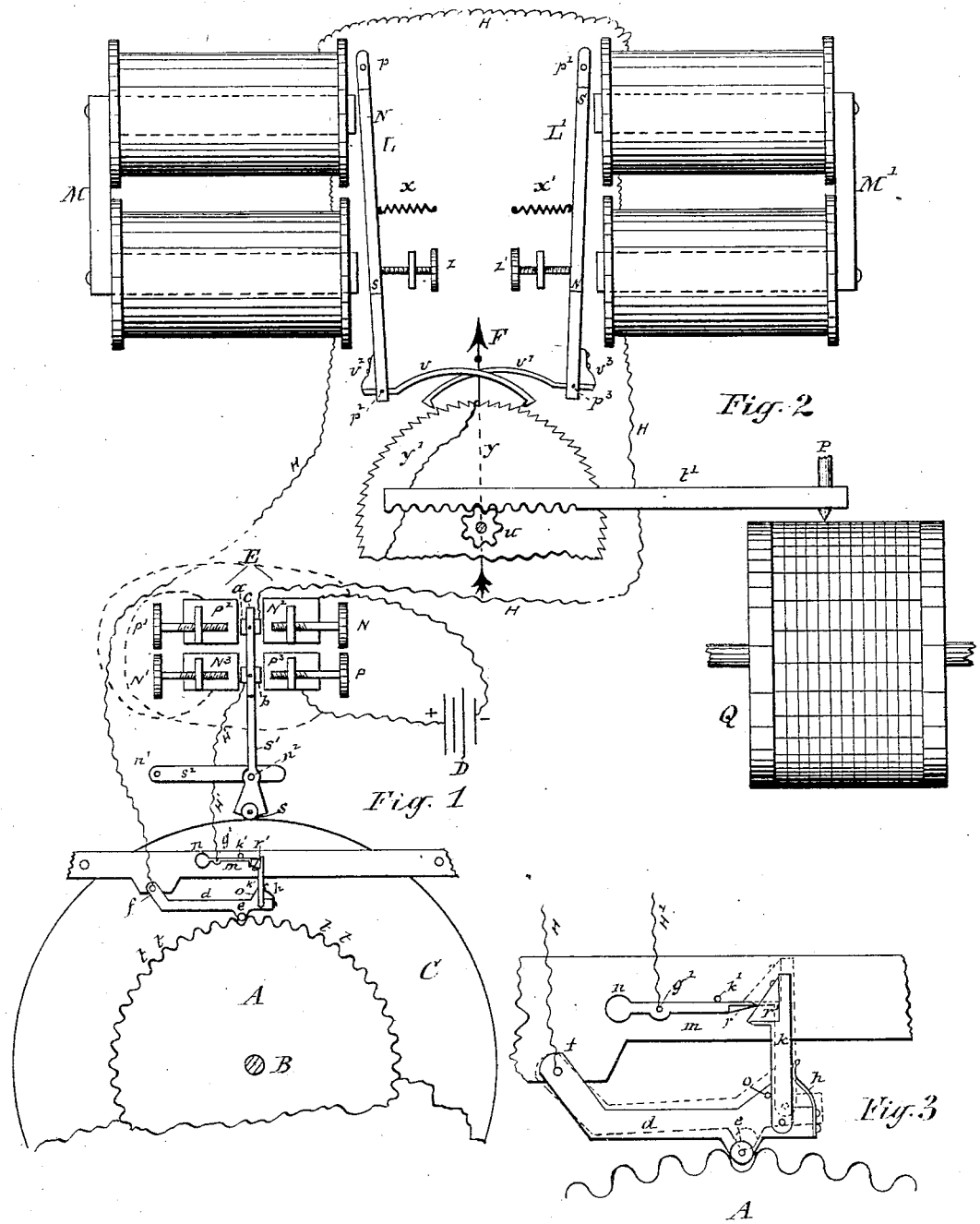

UNITED STATES PATENT OFFICE.

HENRY F. THOMSEN, OF WATERLOO, NEW YORK.

ELECTRICAL INDICATOR AND RECORDER.

SPECIFICATION forming part of Letters Patent No. 232,156, dated September 14, 1880.

Application filed June 10, 1880. (No model.)

*To all whom it may concern:*

Be it known that I, HENRY F. THOMSEN, of Waterloo, in the county of Seneca, in the State of New York, have invented new and useful Improvements in Electrical Indicators and Registers, of which the following, taken in connection with the accompanying drawings, is a full, clear, and exact description.

The invention consists of peculiar mechanisms actuated by the motion to be indicated and registered, and by means of which a series of electrical impulses are sent out from a suitable battery, their direction, whether positive or negative, depending on the direction of the motion, and their frequency depending on the amount of that motion, said impulses being received by a series of electro-magnets provided with polarized armatures, by means of which they are reconverted into mechanical motions corresponding in direction and frequency with said impulses.

The invention also consists of mechanisms to be actuated by said electro-magnetic motions in such a manner as to indicate and register their direction and frequency.

The invention is fully illustrated in the accompanying drawings, in which—

Figure 1 represents the transmitting-instrument; Fig. 2, the receiving-instrument, and Fig. 3 an enlarged detail view of a part of the transmitting-instrument.

Similar letters of reference indicate corresponding parts.

A wheel, A, provided with cams or corrugations $t$, is mounted rigidly on a spindle or arbor, B, which is suitably connected with the object whose motion is to be indicated and registered, so as to partake of said motion. A metallic lever-arm, $d$, hinged at or near one of its extremities, $f$, and carrying a roller, $e$, at its free end, keeps, by its own gravity or by a spring, said roller in constant contact with the cams $t$ on the wheel A, and is thus caused to rise and fall as said cams pass under the roller. This lever-arm $d$ is in electrical communication with the receiving-instrument by a wire, H, connected to the pivoted end of said lever. On the free end of the lever $d$ is a second metallic arm, $k$, hinged thereto, and held yieldingly in an upright position by a spring, $h$, pressing said arm against a shoulder, $o$ on the lever $d$. The opposite end of the arm $k$ is provided on the side facing the shoulder $o$ with an offset or shoulder, upon the top of which is secured an insulating-block, $r'$, which is beveled toward the upper extremity of the arm $k$, for the purpose hereinafter demonstrated.

At right angles to the arm $k$, and facing the aforesaid beveled end thereof, is situated a third metallic arm, $m$, pivoted at $g'$, and held yieldingly in a horizontal position by either a spring or a counterpoise, $n$, on one end and a stop, $k'$, at the opposite end of the arm $m$. This latter end of the arm $m$ is in close proximity to the beveled free end of the arm $k$, and is also provided on its under side with an insulating-facing $r$.

C denotes a wheel or disk fixed to the shaft or spindle B. Upon the periphery of said disk bears a friction-roller, $s$, pivoted to an arm, $s'$, which is arranged radially from the disk, and is pivoted, as at $n^2$, to and carried by the free end of another pivoted arm, $s^2$, arranged at right angles to the former. The arm $s^2$ is pivoted at or near one of its extremities, as at $n'$, and serves to keep the roller $s$ in constant contact with the disk C. The outer or farthest end of the arm $s'$ forms a part of a pole changer or commutator, H, consisting of a piece of vulcanite or other insulating material, $c$, to which are fastened two metallic pieces, $a$ and $b$, projecting at opposite sides of the insulating-piece $c$, the metal piece $a$ being connected in circuit with the wire H from the receiving-instrument, and the other piece, $b$, in electrical connection with the lever-arm $m$, before mentioned. The blocks $a$ and $b$ play over insulated metallic plates $P^2$ and $N^3$, $N^2$, and $P^3$, which are adjustable in their relative positions, respectively, at opposite sides of the arm $s'$, and provided, respectively, with the four adjustable contact-screws $P'$, $N'$, N, and P, which, by the contact of their extremities with the arm $s'$, limit and regulate the motion of said arm in either direction, so that when turned to the right the metallic contact-pieces $a$ and $b$ will move over the plates $N^2$ and $P^3$ and be clear of the plates $P^2$ and $N^3$, and when turned to the left the aforesaid relation will be reversed. Plates $N^2$ and $N^3$ are in electrical communication with the negative pole of a battery, D, and P² and P³ with the positive pole of same.

It is obvious that the system of connection described is not imperative, but can be changed about without materially affecting the principle.

The receiving-instrument, Fig. 2, consists, primarily, of two electro-magnets, M and M', whose like poles are placed facing each other. The current from the battery at the transmitting-instrument traverses both coils or sets of coils in a single continuous circuit and returns to its source either by return wire or ground. Each electro-magnet is provided with a polarized armature, L L', so arranged with respect to the poles of the former that with a current in one direction one of them will be repelled and the other attracted, while with the current in the opposite direction the reverse will be the case. These armatures are pivoted at one extremity, as at $p$ and $p'$. They carry at their opposite extremities the pawls $v$ and $v'$, hinged thereto at $p^2$ and $p^3$, and held normally in a suspended horizontal position by shoulders or stops $v^2$ and $v^3$, limiting the descent of said pawls. The armatures with their pawls are limited and adjusted in their motions by set-screws $z$ and $z'$.

It will be seen that the relative position of the electro-magnets and their respective polarized armatures need not be confined to that described. The poles of either or each electro-magnet with those of its armature may be reversed without affecting the result. Nor need the number of electro-magnets be extended to two. One electro-magnet with its opposite poles facing each other, and each provided with an armature, as described, would be sufficient. It is also obvious that one armature provided with a double pawl similar to those described will suffice to accomplish the object; but for ease of adjustment and reliability of action the arrangement as given is recommended.

$y\ y'$ denote two ratchet-wheels or their equivalent, with the teeth of one pitched in the opposite direction from those of the other. These ratchet-wheels are both on the same spindle or arbor and rigid thereon, and have their periphery in such relation to the pawls $v$ and $v'$ as to barely clear said pawls when in their normal position, as before described. Both the pawls and the ratchet-teeth are so constructed that when either of the armatures is attracted toward its respective magnet or pole the pawl pivoted to it will engage with the ratchet-teeth and move the ratchet-wheel a definite number of teeth, the other armature with its pawl remaining at rest, and, being clear of the ratchet-teeth, allowing the passage of the wheel. To the same shaft bearing the ratchet-wheels is fixed a pinion, $u$, the teeth of which engage in a rack, $t'$, to one end of which is attached a pencil-point, P. Underneath this pencil-point P is a cylinder, Q, mounted on an arbor parallel to the rack $t'$, and moved at a regular constant speed by clock-work. This cylinder is faced with a band of paper ruled with parallel lines, in the usual manner, to represent definite portions of the amount of the motion to be indicated and registered, and ruled with cross-lines at suitable intervals to represent definite portions of time.

The method of operation of the invention is as follows: The motion to be indicated and registered, imparting a corresponding motion to the shaft B in the transmitting-instrument, turns also the cam-wheel A, fixed to said shaft, thus causing the lever $d$ to rise and fall as the cams on the periphery of the wheel pass under the roller $e$, attached to the lever, as illustrated in Fig. 3 of the drawings. As the lever $d$ rises it carries upward with it the arm $k$, hinged thereto, as described. The mitered or wedging insulating-face of the arm $k$, pressing against that of the restrained end of the arm $m$, causes the former to be forced aside until its base or hook end has passed the top of the arm $m$, when the spring $h$ will throw it forward and cause the metallic projection under the insulating-block $r'$ of the arm $k$ to come in contact with the metal upper face of the arm $m$, and thus complete the circuit, which sends an electric impulse to the receiving-instrument. As the roller $e$ enters the interstices between the cams of the wheel A the arm $d$, with its arm $k$, descends and draws down with it the hinged arm $m$ until the angle of their contact causes the arm $k$ to slip off the arm $m$, and allows the same to return to its position of rest, when the electric current is again broken by the insulating-faces of the arms $m$ and $k$.

When the cam-wheel A is connected with an oscillating or vibrating object, such as the spindle of a steam-gage, the disk C, moving synchronously with the cam-wheel A, produces, by its friction on the roller $e$, a vibratory motion of the lever $s'$, carrying said roller, which oscillation of the lever $s'$ between the plates P² N² and N³ P³ changes the electric currents from positive to negative and conversely in the manner before described. The parts are so constructed and arranged in relation to each other that when the roller $e$ has reached the highest point of its motion on the cams of the wheel A and the circuit is complete through the arms $k\ m$ the commutator $s'$ will simultaneously be in contact with either the screws P and N or screws N' P', according to the direction of the motion of the disk C. The contact with the screws P N produces a positive current from the battery D, through the plate P³, contact-piece $b$, arms $m$, $k$, and $d$, to the receiving-instrument, through the electro-magnets, and back of the contact-piece $a$ and plate N² to the battery D. A reverse movement of the disk C throws the commutator in contact with the screws N' P' and causes a negative current from the battery D to pass into the contact-piece $b$, through the plate N³, and, by means of the same connections mentioned above, back by the contact-piece $a$, plate $P^2$, to the battery, as will be seen, just the reverse of the course described above.

The effect of the peculiar arrangement of the circuit-closing device and commutator is as follows: When once the circuit is closed by the contact of arms $m$ $k$ and the commutator contact pieces and plates, it will remain closed until the roller $e$ is again at or near the bottom of one of the cavities between the cams of the wheel A, and when once the circuit is broken at $r$ and $r'$ it will not again be completed until the same roller $e$ reaches its highest position, making it impossible, therefore, for any slight trembling motion to break the circuit and then restore it by returning to its first position without a corresponding change in the direction of the current, avoiding what would otherwise be a prolific cause of inaccuracy, since the motion of the arm $s'$ of the commutator, and consequently of the contact-pieces $a$ and $b$, is so adjusted with reference to the plates $P^2$, $P^3$, $N^2$, and $N^3$ that these pieces $a$ and $b$ do not leave the one set of plates with which they are in contact until the current is broken at $r$ and $r'$.

In the receiving-instrument, when an electrical impulse in one direction enters the coils of the electro-magnets M and M', one of the polarized armatures, arranged as described, will be attracted and the other repelled—that is, held in its position of rest against one of the stops $z$ or $z'$. A current in the opposite direction will cause the latter to be attracted and the former to be at rest.

As described above, each armature when attracted carries with it the pawl $v$ or $v'$ hinged to it. The pawl engages with the ratchet-teeth of one of the wheels $y$ or $y'$, and thus turns said wheel in one direction or the other, depending on which armature is attracted by the magnet. The motion of the aforesaid ratchet-wheels turns also the pinion $u$, fixed to the same spindle or arbor, and thus moves backward or forward the rack $t'$, engaging in the pinion. The rack, by the pencil-point P connected therewith, traces a line on the ruled paper on the cylinder Q, which is rotated by clock-work, as hereinbefore described.

F represents a pointer or needle attached to the arbor of the ratchet-wheels $y$ $y'$, said pointer being arranged to move before a graduated face or dial (not shown in the drawings) and indicating the amount of motion of the ratchet-wheels.

Thus every passage of one of the cams of the wheel A under the roller $e$, representing a definite and fixed part of the motion to be indicated and registered, will cause a definite motion in the ratchets $y$ and $y'$, and consequently of the needle and pencil-point, the direction depending upon the control exerted by the commutator over the direction of the current from a battery, the action of the commutator depending upon the direction of rotation of the disk C, actuated by the motion to be indicated and registered.

Having thus described my invention, what I claim as new, and desire to secure by Letters Patent, is—

1. In combination with the electro-magnets and commutator, the oscillating arm $d$, having the flexible hook-arm $k$, provided with an insulated beveled extremity, and the pivoted arm $m$, having the under side of its extremity insulated in proximity to the insulated end of the arm $k$, substantially in the manner described and shown.

2. The cam-wheel A, lever $d$, provided with roller $e$, the arm $k$, hinged to lever $d$ and having an insulated beveled free end with an uninsulated projection at the beginning of the bevel, the pivoted arm $m$, having counterpoise $n$ at one end and insulating-block $r'$ on the under side of the opposite end, and the stop $k'$, in combination with the electro-magnets and the commutator, substantially as shown and set forth.

3. The within-described commutator, consisting of the adjustable plates $N^2$ $N^3$ $P^2$ $P^3$, connected with the battery D, as shown, and provided with adjustable contact-screws N, N', P', and P, and the pivoted arm $s'$, provided with metallic pieces $a$ $b$, substantially as described and shown.

4. The combination of the disk C, lever $s'$, pivoted to hinged arm $s^2$, and provided at one end with friction-roller $s$ and at the opposite end with metallic pieces $a$ $b$, plates $P^2$ $P^3$ $N^2$ $N^3$, provided with set-screws P' P N N', and battery D, substantially in the manner shown and set forth.

5. The combination of the cam-wheel A, lever $d$, provided with roller $e$, the flexible arm $k$, having insulated beveled end $r'$, lever $m$, having insulated beveled end $r$, stop $k'$, wires H H', disk C, fixed to the arbor of the wheel A, lever $s'$, pivoted to vibratory arm $s^2$, and provided at one end with roller $s$ and at the opposite end with the metallic pieces $a$ $b$, plates $P^2$ $P^3$ $N^2$ $N^3$, screws P P' N N', battery D, and the electro-magnets, all substantially as described and shown.

6. The combination of the electro-magnets, polarized armatures L L', pawls $v$ $v'$, and ratchet-wheels $y$ $y'$, substantially in the manner and for the purpose specified.

7. The combination of the electro-magnets, polarized armatures L L', pawls $v$ $v'$, ratchet-wheels $y$ $y'$, pinion $u$, and the rack $t'$, provided with a tracing-point, P, arranged to traverse a moving registering-sheet, substantially as shown and set forth.

8. The combination of the electro-magnets, polarized armatures L L', pawls $v$ $v'$, ratchet-wheels $y$ $y'$, and pointer F, substantially as described and shown.

9. The combination of the cam-wheel A, lever $d$, provided with roller $e$, the flexible arm $k$, having insulated beveled end $r'$, lever $m$, having insulated beveled end $r$, stop $k'$, wires H H′, disk C fixed to the arbor of the wheel A, lever $s'$, pivoted to vibratory arm $s^2$, and provided at one end with roller $s$ and at the opposite end with the metallic pieces $a$ $b$, plates $P^2$ $P^3$ $N^2$ $N^3$, screws P P′ N N′, battery D, electro-magnets, armatures L L′, pawls $v$ $v'$, ratchet-wheels $y$ $y'$, pinion $u$, rack $t'$, provided with pencil P, and the graduated cylinder Q, all as shown and described.

In testimony whereof I have hereunto signed my name and affixed my seal, in the presence of two attesting witnesses, at Syracuse, in the county of Onondaga and State of New York, this 15th day of May, 1880.

HENRY F. THOMSEN. [L. S.]

Witnesses:
 E. LAASS,
 WM. C. RAYMOND.